United States Patent [19]

Toshikuni et al.

[11] Patent Number: 4,693,833

[45] Date of Patent: Sep. 15, 1987

[54] METHOD OF TREATING RADIOACTIVE WASTE WATER RESULTING FROM DECONTAMINATION

[75] Inventors: Masami Toshikuni; Kazunori Suzuki; Norie Yoshida, all of Kanagawa, Japan

[73] Assignee: JGC Corporation, Tokyo, Japan

[21] Appl. No.: 758,232

[22] Filed: Jul. 24, 1985

[30] Foreign Application Priority Data

Oct. 26, 1984 [JP] Japan .................................. 59-226052

[51] Int. Cl.⁴ .............................................. C02F 1/58
[52] U.S. Cl. .................................. 210/759; 210/763; 210/908
[58] Field of Search ............... 210/759, 763, 908, 909, 210/910, 724, 721, 743

[56] References Cited

U.S. PATENT DOCUMENTS

| 4,332,687 | 6/1982 | Daignault et al. | 210/759 X |
| 4,347,141 | 8/1982 | Rothberg | 210/759 X |
| 4,443,342 | 4/1984 | Stas et al. | 210/759 |

FOREIGN PATENT DOCUMENTS

| 58-34080 | 2/1983 | Japan | 210/759 |
| 58-52599 | 3/1983 | Japan | 210/759 |

Primary Examiner—Tom Wyse
Attorney, Agent, or Firm—Armstrong, Nikaido, Marmelstein & Kubovcik

[57] ABSTRACT

A method of treating radioactive waste water generated during chemical decontamination at nuclear power facilities is disclosed. Decontaminating agents, with organic acids, and normally containing inhibitors and surface active agents, are decomposed by oxidation using hydrogen peroxide, at a temperature of 60°–90° C., in the presence of copper ions, or copper ions and iron ions, as catalysts.

3 Claims, 6 Drawing Figures

METHOD OF TREATING RADIOACTIVE WASTE WATER RESULTING FROM DECONTAMINATION

BACKGROUND OF THE INVENTION

1. Field of the Invention

The present invention relates to a method of treating radioactive waste water generated at nuclear power facilities after chemical decontamination.

2. State of the Art

Radioactive waste water generated by decontamination contains, in addition to crud, a large amount of decontaminating agents. The decontaminating agents, containing formic acid, EDTA, citric acid, ascorbic acid, oxalic acid, and other organic acids, also normally contain organic inhibitors and surface active agents. Ultimately, the radioactive waste water is evaporated and concentrated, and the residue is solidified, but when decontaminating agents containing the previously mentioned organic acids are present, the properties of the concentrated solid are unfavorable affected, particularly the mechanical strength thereof. Therefore, before the evaporation and concentration process, it is necessary to remove these organic acids.

A method of decomposition by oxidation of organic materials in waste water using $H_2O_2$ in the presence of iron ions is reported in "Chemical Removal of ABS from Water-water Effluents", Hugh R. Eisenhauer, JOURNAL WPCF, VOL. 37, No. 11, and the art of decomposing radioactive ion exchange resins is developed and disclosed in Japanese Patent Disclosures No. 58-72099 and No. 59-44700.

Also, a method of decomposing organic materials using at the same time ultraviolet rays and ozone is known ("OZONE/UV Process Effective Wastewater Treatment", H. W. Prengle, Hydrocarbon Processing, Oct. 1975, p. 82), and there have been attempts to apply this treatment to radioactive organic materials, in Japanese Patent Disclosures No. 58-52598 and No. 58-52599, and Japanese Patent Application No. 58-99847.

However, a method of treating radioactive waste water containing decontaminating agents comprising organic materials has not yet been established.

SUMMARY OF THE INVENTION

The object of the present invention is to provide a method of treating decontaminating agents in radioactive waste water, through decomposition by oxidation of high efficiency, thus eliminating the unfavorable influence of the solidified residue remaining after evaporation and concentration of the waste water.

The method of treating radioactive contaminated waste water according to the present invention is characterized by using hydrogen peroxide in the presence of copper ions, or copper ions and iron ions, acting as catalysts, to cause decomposition by oxidation of decontaminating agents in the waste water. The decontaminating agents, having organic acids as main ingredients, are rapidly decomposed at a low temperature of 60°-90° C., using $H_2O_2$ in the presence of the above catalysts.

It is necessary to carry out the decomposition at a low temperature in order to prevent transfer of radioactive organic materials into an off-gas system, and the use of copper ions as one of the catalysts is essential for successful decomposition.

DRAWINGS

DETAILED EXPLANATION OF PREFERRED EMBODIMENTS

When copper ions are used as a catalyst independently, a 0.005–0.02 mol/liter concentration is used.

When copper ions and iron ions are mixed, each has a concentration of 0.005–0.02 mol/liter.

Inorganic or organic copper salts such as copper sulfate, copper nitrate, copper chloride, and copper acetate can be used as the copper ion source.

Iron sulfate, ferric nitrate, and ferric chloride salts can be used as the iron ion source.

The hydrogen peroxide is supplied at a concentration of 30–70% by weight.

Both batchwise and continuous methods of decomposition by oxidation can be used, but in the treatment of contaminated waste water discharged from usual nuclear power facilities the batchwise method is sufficient.

With the batchwise method which decomposes most of the organic acids, the end point of the reaction can easily be determined by measuring the change over time in the pH of the waste water, because the pH rises from the acid side to a neutral range of 6–8 at the end point of the decomposition by oxidation.

Because the reaction generates heat, the heat of reaction will maintain a suitable temperature after the system has been heated to 65° C. in its early stage.

With the method of the present invention, due to a highly efficient decomposition by oxidation treatment, at a low temperature, of radioactive waste water containing decontaminating agents comprising organic wastes, a solidified product of high strength can be obtained when the residue from the evaporation and concentration of the waste water is solidified.

There is no problem of releasing radioactivity because the reaction is carried out at a low temperature.

The reaction ends with a neutral pH liquid and therefore the addition of an alkali is not necessary.

EXAMPLES

Figure 1:
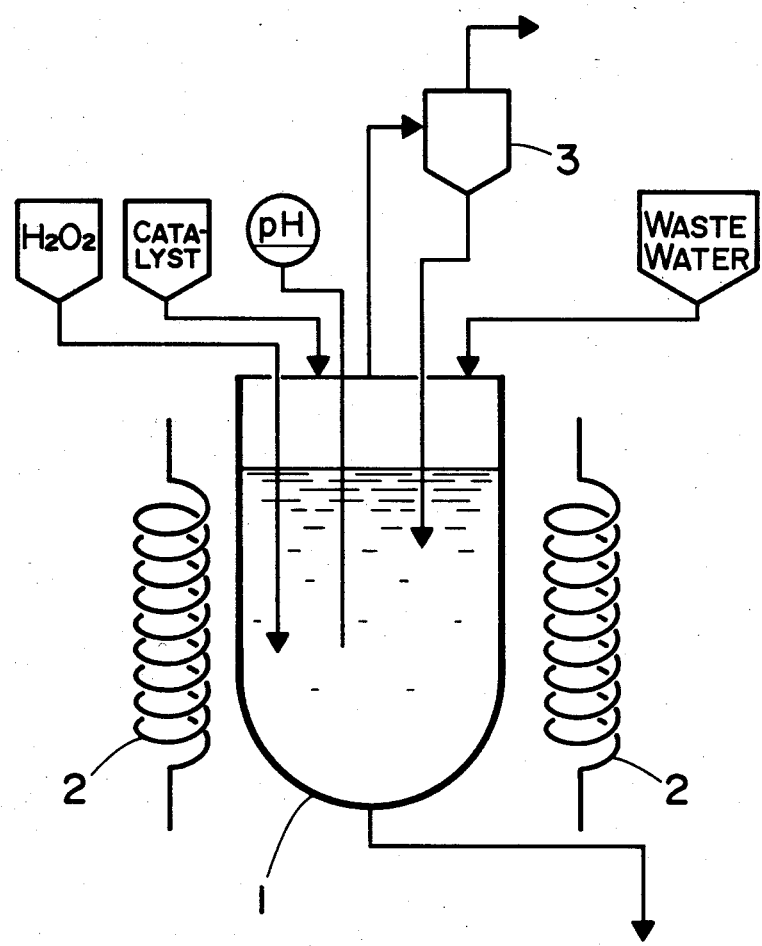
FIG. 1 is a section view showing equipment used for a decomposition by oxidation reaction in order to carry out the method of the present invention.

The method of the present invention will be explained below in detail. First, a wet process decomposition by oxidation apparatus was constructed, as shown in FIG. 1, with a reaction vessel 1 and heating means 2. Steam generated in the reaction is condensed in condenser 3 and returned to the system while gases exit the system.

Simulated decontaminated waste waters were prepared with the following compositions:

Waste Water A

A liquid containing a 30 grams/liter mixture of such organic acids as citric acid, formic acid, ascorbic acid, and oxalic acid, along with crud (0.62 grams/liter as Fe).

Waste Water B

A liquid containing 10 grams/liter of EDTA and crud (0.62 grams/liter as Fe).

Waste Water C

A liquid containing 30 grams/liter of EDTA and crud (0.62 grams/liter as Fe).

EXAMPLE 1

The effects of the addition of an iron catalyst alone, and together with a copper catalyst, were tested, when 35% $H_2O_2$ was supplied at a fixed rate of 40 ml/hour to 1000 ml of Waste Water A, at a reaction temperature of 70° C., to carry out a wet decomposition by oxidation.

|  | Catalyst mol/liter | Initial TOC mg/liter | Initial pH |
|---|---|---|---|
| Control | FeSO$_4$ 0.01 | 11,000 | 3.3 |
| Example 1 | FeSO$_4$ 0.01 CuSO$_4$ 0.005 | 11,030 | 3.7 |

Figure 2:
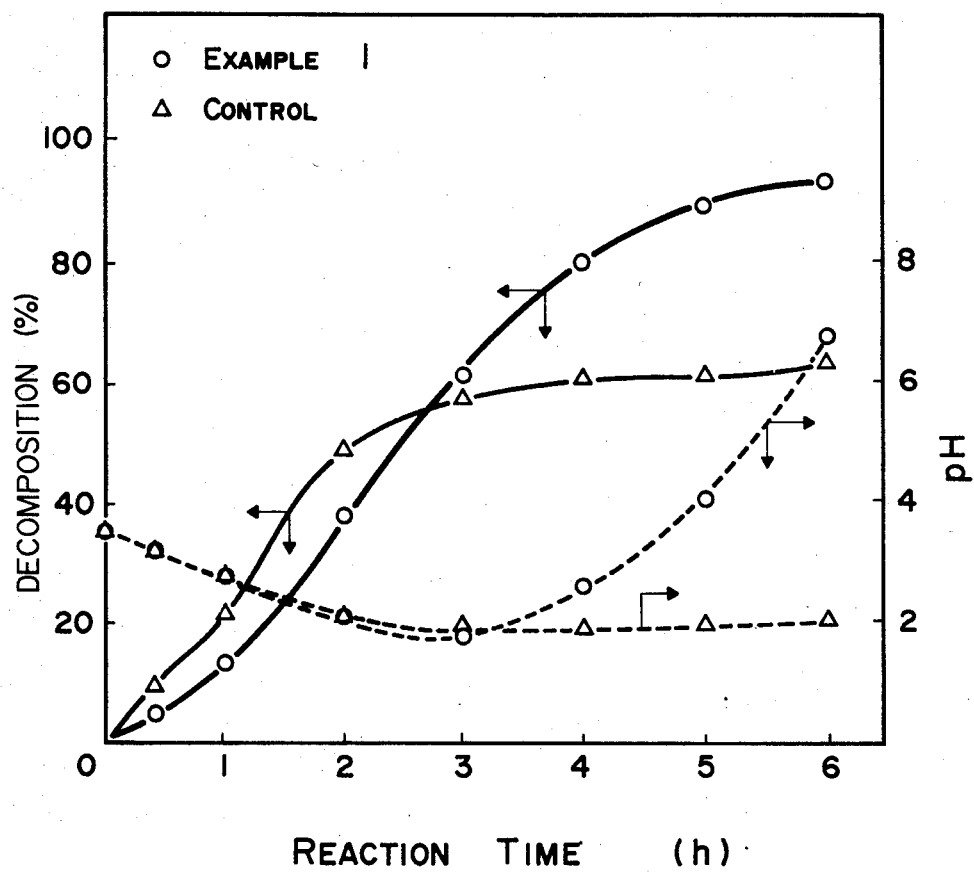
FIGS. 2–6 are graphs showing changes in decomposition percentage and pH of the organic acids, based on reaction time, and indicate the effectiveness of the method according to the present invention.

The decomposition rate of the organic acids and the pH of the reaction liquid were measured at fixed intervals and the results are shown in FIG. 2.

Decomposition rate is defined as follows:

$$\text{Decomposition rate (\%)} = \frac{\text{Initial } TOC - TOC \text{ after Reaction}}{\text{Initial } TOC} \times 100$$

EXAMPLE 2

To see the effect of the addition of a mixture of an iron catalyst and a copper catalyst, decomposition by oxidation of Waste Water A was carried out at the same temperature and $H_2O_2$ supply rate as in Example 1.

|  | Catalyst mol/liter | Initial TOC mg/liter | Initial pH |
|---|---|---|---|
| Example 2 | FeSO$_4$ 0.01 CuSO$_4$ 0.001 | 11,380 | 3.3 |

Figure 3:
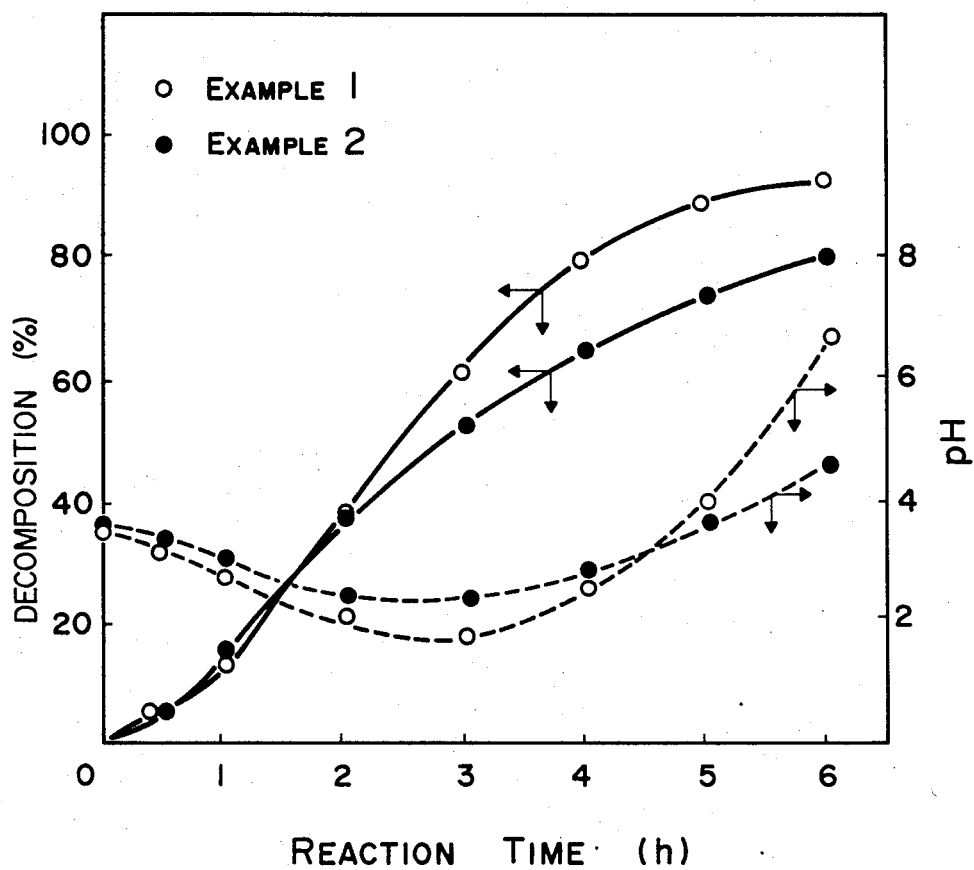

The results are shown in FIG. 3. For comparison, the data from Example 1 are also shown.

EXAMPLES 3, 4, AND 5

To see the effect of catalyst composition, decomposition by oxidation of Waste Water A was carried out, at a temperature raised to 80° C.

|  | Catalyst mol/liter | Initial TOC mg/liter | Initial pH |
|---|---|---|---|
| Example 3 | FeSO$_4$ 0.01 CuSO$_4$ 0.01 | 11,280 | 3.4 |
| Example 4 | FeSO$_4$ 0.01 CuSO$_4$ 0.005 | 10,350 | 3.4 |
| Example 5 | CuSO$_4$ 0.02 | 11,050 | 3.2 |

Figure 4:
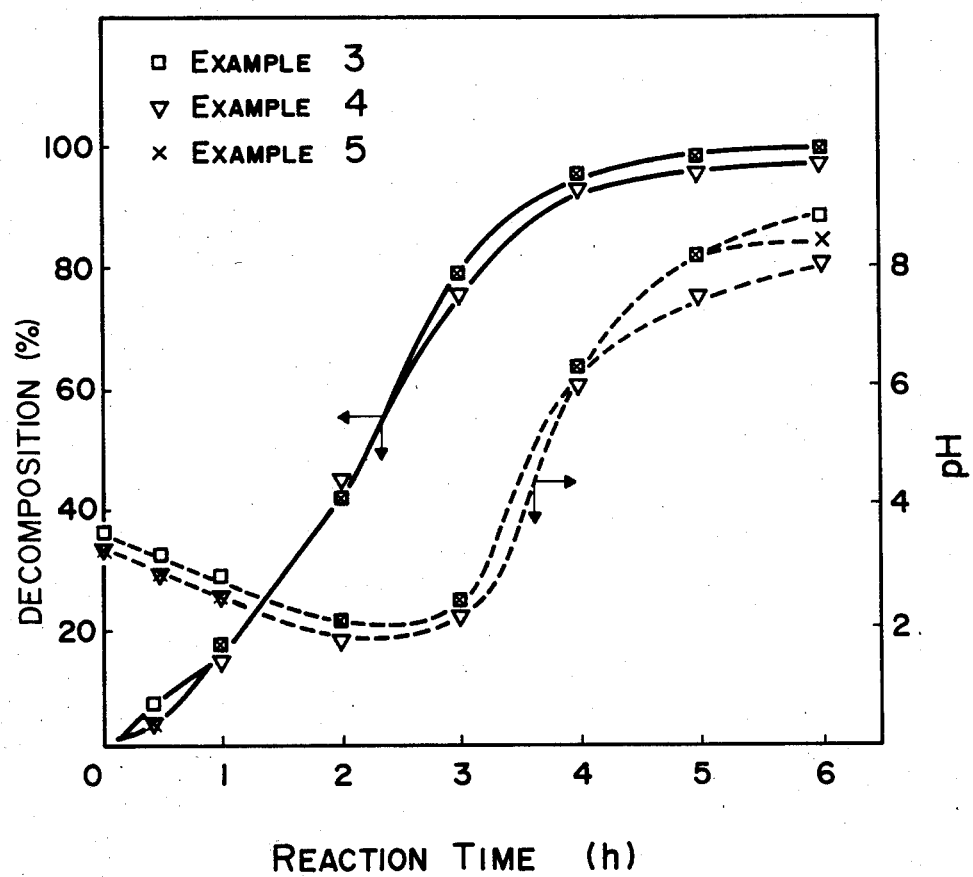

The results are shown in FIG. 4.

EXAMPLE 6

To see the effect of temperature when using an iron-copper mixed catalyst, a catalyst with the same composition as in Examples 1 and 4 was treated at 60° C.

|  | Catalyst mol/liter | Initial TOC mg/liter | Initial pH |
|---|---|---|---|
| Example 6 | FeSO$_4$ 0.01 CuSO$_4$ 0.005 | 10,980 | 3.4 |

Figure 5:
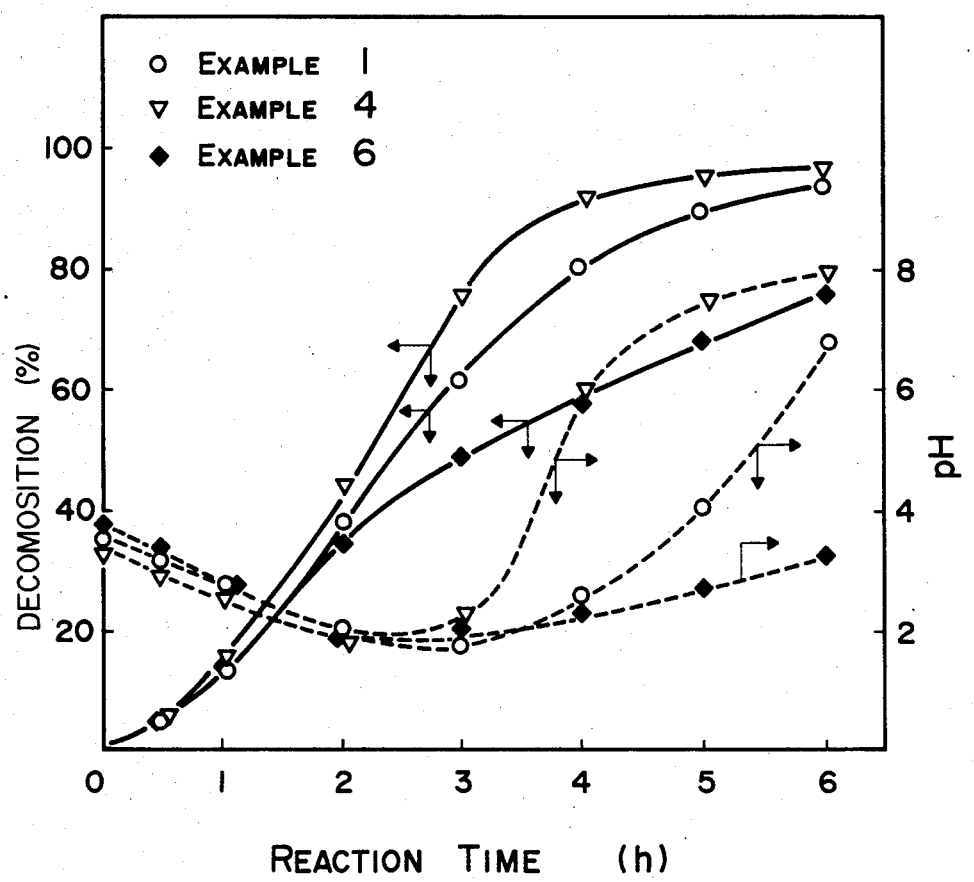

The results, along with those of Example 1 (70° C.), and Example 4 (80° C.) for comparison, are shown in FIG. 5.

EXAMPLES 7, 8, AND 9

Waste Water A (Example 7) and Waste Water B (Examples 8 and 9) were treated, at 80° C., with an $H_2O_2$ supply rate of 40 ml/hour.

|  | Catalyst mol/liter | Initial TOC mg/liter | Initial pH |
|---|---|---|---|
| Example 7 | FeSO$_4$ 0.01 CuSO$_4$ 0.02 | 4,100 | 1.5 |
| Example 8 | FeSO$_4$ 0.01 CuSO$_4$ 0.02 | 12,300 | 1.5 |
| Example 9 | FeSO$_4$ 0.01 CuSO$_4$ 0.06 | 12,300 | 1.5 |

Figure 6:
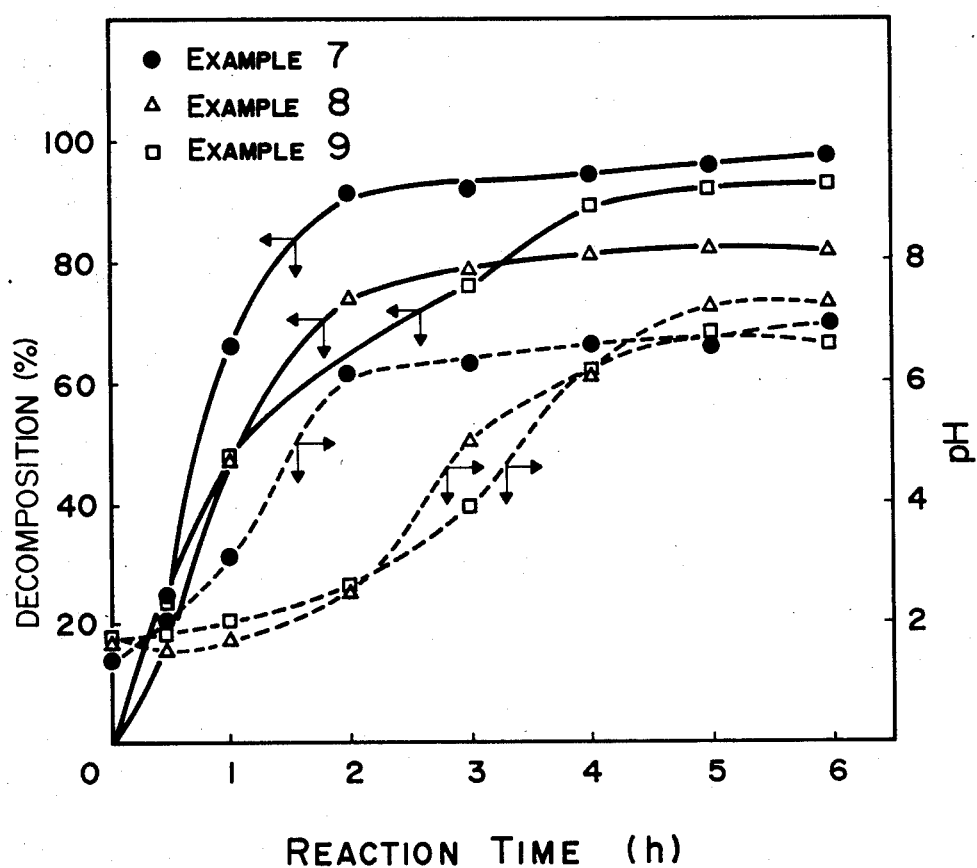

The results are shown in FIG. 6.

We claim:

1. A method of treating readioactive waste water containing organic material resulting from decontamination, comprising decomposing said organic material by oxidation using hydrogen peroxide at a temperaure of 60°-90° C. in the presence of copper ions and iron ions as catalysts, said organic material consisting essentially of at least one organic acid, one organic inhibitor, and one surface active agent.

2. A method of treating according to claim 1, in which the copper ion concentration is 0.005-0.02 mol/liter and the iron ion concentration is 0.005-0.02 mol/liter.

3. A method of treating according to claim 1, in which the end point of the decomposition by oxidation reaction is detected by measuring the change over time is the pH of the water containing the decomposed wastes.

* * * * *